United States Patent
Nishikawa

(10) Patent No.: US 6,750,871 B2
(45) Date of Patent: Jun. 15, 2004

(54) MEMORY CONSOLIDATED IMAGE PROCESSING LSI, IMAGE PROCESSING SYSTEM WITH SAME, AND IMAGE ACCESSING METHOD USING SAME

(75) Inventor: Tsuyoshi Nishikawa, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 405 days.

(21) Appl. No.: 09/773,625

(22) Filed: Feb. 2, 2001

(65) Prior Publication Data

US 2001/0013081 A1 Aug. 9, 2001

(30) Foreign Application Priority Data

Feb. 4, 2000 (JP) ......................................... 2000-027911

(51) Int. Cl.[7] ............................................... G06F 12/02
(52) U.S. Cl. ....................... 345/544; 345/543; 345/555; 713/300; 711/111
(58) Field of Search ................................. 345/555, 543, 345/544; 713/300, 330, 340; 711/111, 150; 382/173, 175, 177; 707/3, 5, 6

(56) References Cited

U.S. PATENT DOCUMENTS

| | | | | |
|---|---|---|---|---|
| 4,680,643 A | * | 7/1987 | Horiguchi | 358/409 |
| 5,471,420 A | * | 11/1995 | Nii et al. | 365/182 |
| 5,701,267 A | * | 12/1997 | Masuda et al. | 365/201 |
| 5,818,776 A | * | 10/1998 | Shibutani et al. | 365/221 |
| 6,125,432 A | * | 9/2000 | Hanami et al. | 711/157 |

OTHER PUBLICATIONS

Yen–Jen Chang et al disclosed: Page Cache: An Efficient Partition Architecture For Reducing Power, Area and Access Time (2002 IEEE).*

Yong–Ha Park et al disclosed: 7.1 GB/sec Bandwidth for 3D Rendering Engine Using the EML Technology (1999 IEEE).*

T. Nishikawa, et al., IEEE International Solid–State Circuits Conference, pps. 182–183 and 230–231, "TP 14.1: A 60MHz 240mW MPEG–4 Video–Phone LSI with 16Mb Embedded DRAM," 2000.

T. Nishikawa, Toshiba Review 2000, vol. 55, No. 5, pps. 54–57, "MPEG–4 Videophone LSI," May 1, 2000.

International Conference, Monthly Electronics Magazine, pps. 75–77, "MPEG–4 Videophone LSI," Jun. 2000.

* cited by examiner

Primary Examiner—Matthew C. Bella
Assistant Examiner—Mackly Monestime
(74) Attorney, Agent, or Firm—Oblon, Spivak, McClelland, Maier & Neustadt, P.C.

(57) ABSTRACT

In a memory consolidated image processing LSI for reading data, a DRAM for storing image data for a plurality of page ranges which are formed by segmenting an image plane corresponding to a display screen in order to page-access a memory region of the DRAM, and image data for a plurality of word ranges which are formed by segmenting each of the page ranges in order to word-access the memory region, is consolidated with an image processing circuit. The size of each of the page ranges is set so that the multiplied value of the power consumption per pre-charge in a power consumption model of a memory by an average number of pre-charges is the substantially minimum value, and the size of each of the word ranges is set so that the multiplied value of the power consumption per word access in the power consumption model of the memory by an average number of word accesses is the substantially minimum value. Thus, it is possible to reduce the power consumption when a page access and a word access are carried out, so that the memory consolidated image processing LSI can be mounted on a portable image processing system.

26 Claims, 13 Drawing Sheets

1 PAGE =256-BYTE CONSOLIDATED DRM IMAGE IS SEGMENTED INTO SUCH SQUARE REGIONS TO BE STORED EVERY PAGE.

WHERE
$1 <= Z <= X$

N IS NATURAL NUMBER TO BE
$(N-1) \cdot X < Y <= N \cdot X$
(IN THIS CASE, N = 3)

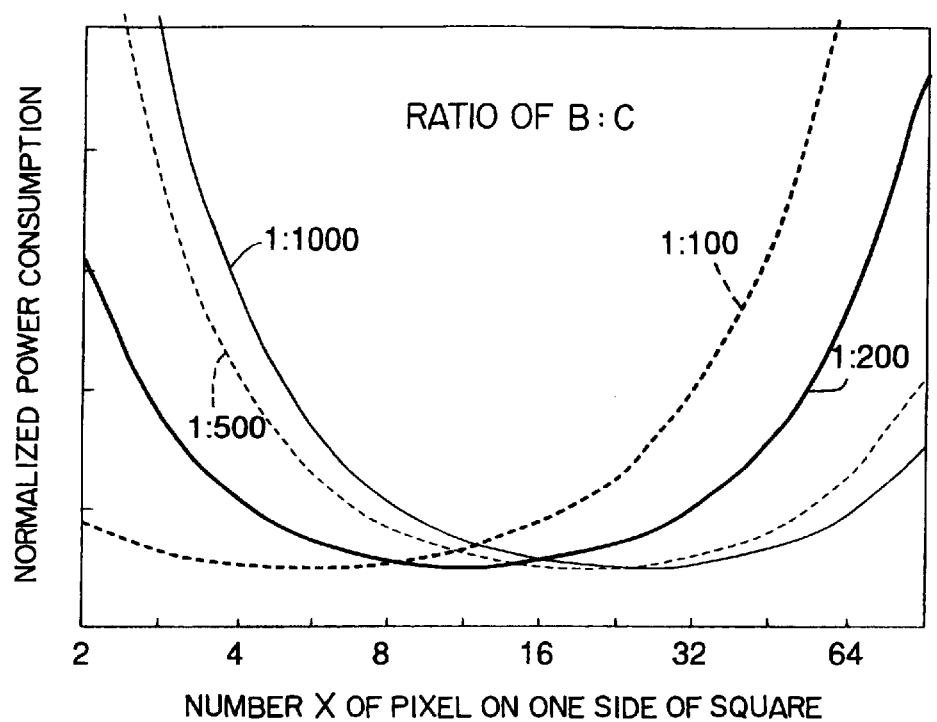
F I G. 7
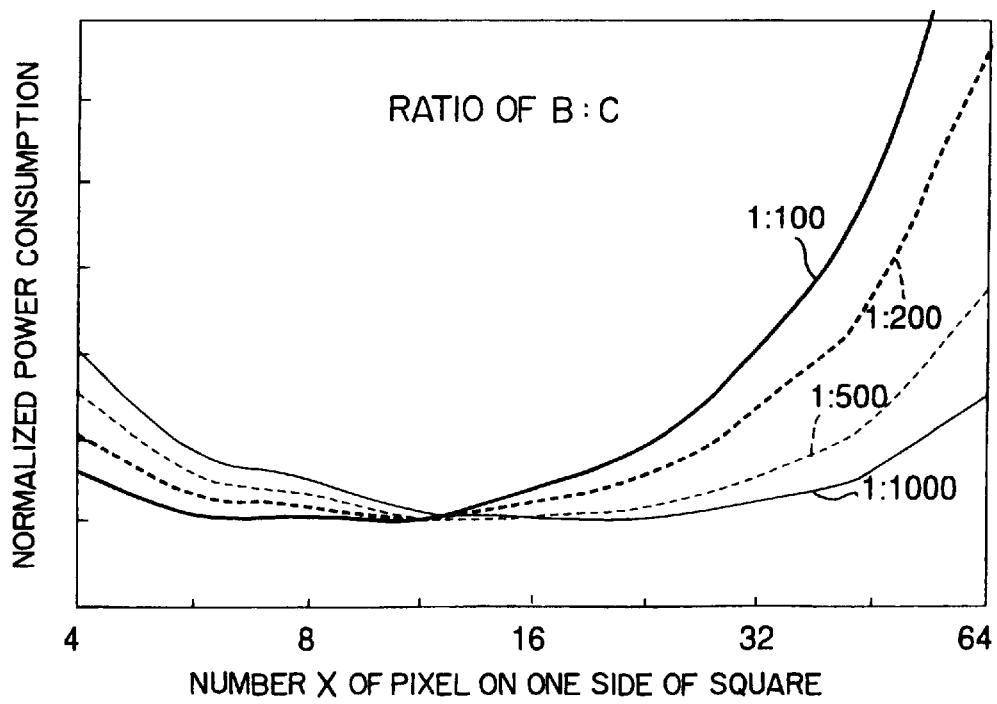
F I G. 8

1 WORD = 16-BYTE CONSOLIDATED DRAM
IMAGE IS SEGMENTED INTO SUCH SQUARE
REGIONS TO BE STORED EVERY WORD.

1 WORD = 16-BYTE CONSOLIDATED DRAM
IMAGE IS SEGMENTED INTO RECTANGULAR REGIONS WITH
LATERAL SIZES 8 PIXELS LONG TO BE STORED EVERY WORD.

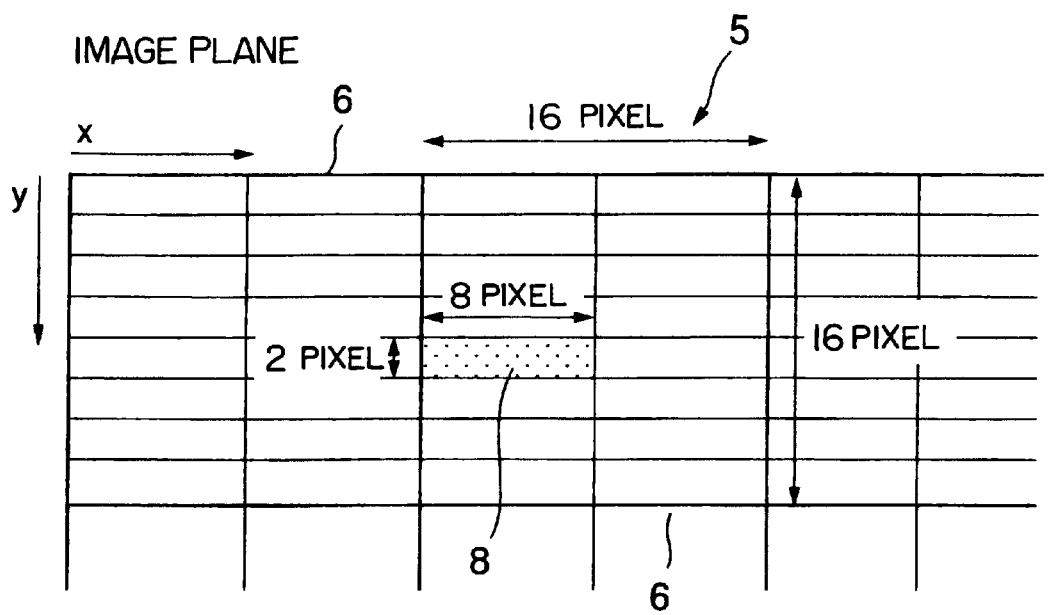
THICK LATTICE IS STORED IN ONE PAGE.
THIN LATTICE IS STORED IN ONE WORD.
ONE PAGE COMPRISES 16 WORDS
F I G. 15
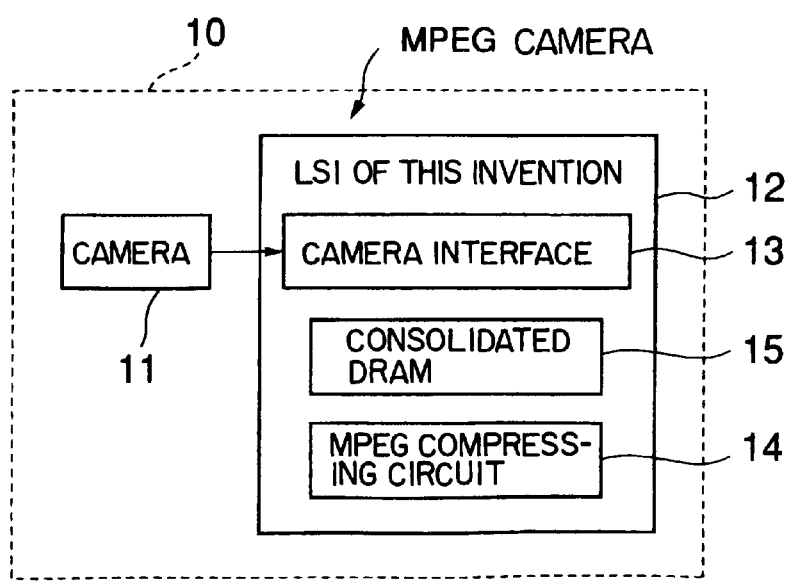
F I G. 16

MEMORY CONSOLIDATED IMAGE PROCESSING LSI, IMAGE PROCESSING SYSTEM WITH SAME, AND IMAGE ACCESSING METHOD USING SAME

CROSS REFERENCE TO RELATED APPLICATION

This application claims benefit of priority under 35 U.S.C. §119 to Japanese Patent Application No. 2000-27911, filed on Feb. 4, 2000, the entire contents of which are incorporated by reference herein.

BACKGROUND OF THE INVENTION

The present invention relates generally to a memory-consolidated image processing LSI (Large Scale Integrated circuit). More specifically, the invention relates to a memory-consolidated image processing LSI capable of being driven at low power consumption. Memory elements consolidated with an image processing part to constitute a memory part include ferroelectric random access memories (FeRAMs), magneto-resistance random access memories (MRAMs) and so forth.

Conventional memory consolidated image processing LSIs are designed to improve the processing speed for writing or the like, and have been scarcely taken measures to cope with the decrease of the driving power of the LSIs.

In order to access the memory part of the memory consolidated image processing LSI, a first power A is first consumed to access the page regions of the storage region of a memory, which comprises a plurality of page regions including a plurality of word regions, and then, a second power B is consumed to access the word regions. For example, referring to FIGS. 1A and 1B, the principle of storage in a conventional memory consolidated image processing LSI for storing image information will be described below. In FIGS. 1A and 1B, as an example of a consolidated memory, a DRAM will be described.

FIG. 1A shows a display screen S of a display unit, such as a CRT (Cathode Ray Tube) or a liquid crystal display, for displaying, e.g., dynamic image data. The display screen S is virtually segmented into a plurality of page regions P. Each of the page regions P comprises a plurality of words L, each of which is, e.g., data for one line scanned in a horizontal scanning period (1H). The data thus virtually segmented on the display screen are stored in a storage region M of the DRAM shown in FIG. 1B. The storage region M comprises a plurality of storage regions P, which correspond to the display screen S, for storing data for one line, and a plurality of word storage regions L, each of which corresponds to data for 1 H to be included in a corresponding one of the storage regions P.

Thus, the conventional memory consolidated image processing LSI is designed to store image data for one frame on the display screen S and data stored in the DRAM so that the image data correspond to the data stored in the DRAM. For that reason, in order to access the DRAM, after the storage region P for each page shown in FIG. 1B is accessed, each word L corresponding to a scanning line is accessed to write or read data.

Therefore, when data for a few pages must be read in order to carry out a process, such as a motion compensation, with respect to dynamic image data, the power A for accessing the pages must be multiplied by the number of the pages (P×n times×power A), and the power B for accessing the words must be multiplied by the number of required words (L×m times×power B). Therefore, the whole power consumption increases in proportion to the numbers of accessed pages and words. As a result, if the region of an image, which is required to be processed, extends over a large number of pages, the power consumption for the pages is required.

Also in image processing LSIs utilizing external memories other than the above described conventional memory consolidated image processing LSIs, a technique called tiling is used for reducing the number of accesses to a DRAM to shorten the access time. The tiling is designed to change the reading sequence of data on a display screen S although it does not change the image range. For example, the tiling takes account of the fact that the reading time is shorten by simultaneously reading two word data on the same page, wherein word data stored in another page exists therebetween, when the two word data are intended to be read. However, since the access speed is improved as the sizes of a page and a word region increase, a larger page size and a larger word size are used. However, when an external memory is utilized, the degree of freedom capable of selecting the sizes of a page and a word is small.

As described above, according to the conventional memory consolidated image processing LSIs, when a memory is accessed to cut out desired image data, excessive page regions are first accessed, and then, a desired word of the words stored therein is accessed, so that there is a problem in that vast amounts of power must be consumed when data to be acquired extends over a few pages.

In addition, memory consolidated image processing LSIs mounted on portable electronics are often driven by a rechargeable battery. Although the loaded battery may have a large charging capacity so that the LSIs can be used for a long time, this prevents the whole electronics from being miniaturized since the weight increases. Therefore, although the capacity of the loaded battery is determined in view of the weight and size to some extent, it has been requested that the power consumption of the LSI should be saved as small as possible.

SUMMARY OF THE INVENTION

It is therefore an object of the present invention to eliminate the aforementioned problems and to provide a memory consolidated image processing LSI capable of accomplishing an efficient power consumption by reducing a first power consumption for accessing a page by the device that the LSI has a size and shape by which an image processing can be most efficiently carried out with respect to the way to segment one of pages constituting a screen when a DRAM is accessed.

In order to accomplish the aforementioned and other objects, according to a first basic construction of the present invention, a memory consolidated image processing LSI comprises: a memory part including a page region for storing image data for a plurality of lattice-like page ranges which are formed by segmenting an image plane corresponding to a display screen and each of which has sides a power of 2 long, and word regions, each of which stores image data for a plurality of word ranges formed by segmenting each of the page ranges and which are assembled to constitute the page region; and an image access part for word-accessing the word ranges after accessing the page ranges by a pre-charge in order to access the memory part. The page region or word region stored in said memory part is set so as to have a multiplied value of a power consumption per one of pre-charges in a power consumption model of a memory by an average number of the pre-charges to be a substantially minimum value, or a multiplied value of a power consumption per one of word accesses in a power consumption model of a memory by an average number of the word accesses to be a substantially minimum value. The substantially minimum value does not mean that the multiplied value completely coincides with the absolutely minimum value, and means that the multiplied value includes proximity values of the minimum value.

According a first aspect of the present invention, in the memory consolidated image processing LSI according to the first basic construction, the page ranges on the image plane wherein image data is stored in the page region of the memory part has a size so that the multiplied value of power consumption per one of the pre-charges in a power consumption model of a memory by an average number of pre-charges is the substantially minimum value.

According to a second aspect of the present invention, in the memory consolidated image processing LSI according to the first basic construction, the word ranges on the image plane wherein image data is stored in the word region of the memory part has a size so that the multiplied value of a power consumption per one of the word accesses in a power consumption model of a memory by an average number of word accesses is the substantially minimum value.

According to a third aspect of the present invention, in the memory consolidated image processing LSI according to the first basic construction, the page ranges on the image plane wherein image data is stored in the page region of the memory part has a size so that the multiplied value of a power consumption per one of the pre-charges in a power consumption model of a memory by an average number of pre-charges is the substantially minimum value, and the word ranges on the image plane wherein image data is stored in the word region of the memory part has a size so that the multiplied value of a power consumption per one of the word accesses in a power consumption model of a memory by an average number of word accesses is the substantially minimum value.

In the memory consolidated image processing LSI according to the first basic construction, the image plane may comprise a plurality of pixels, and the page ranges are formed by segmenting the image plane into rectangular ranges with sides 8 to 16 pixels long or in a rectangular range which has a size approximating to that of the square range and which has an aspect ratio of up to 1:2.

In the memory consolidated image processing LSI with such a construction, a two-dimensional plane, which has been stored in the memory region, may be segmented into square areas having the same capacity as that of the page range or rectangular areas with sides of a ratio of 1:2 to be collectively stored in separate page regions.

In the memory consolidated image processing LSI according to the first basic construction, the image plane may comprise a plurality of pixels, and the word ranges may be formed by segmenting the image plane into rectangular ranges with sides 8 to 16 pixels long or in a rectangular range which has a size approximating to that of the square range and which has an aspect ratio of up to 1:2.

In the memory consolidated image processing LSI with such a construction, a two-dimensional plane, which has been stored in the memory region, may be segmented into square areas having the same capacity as that of the page range or rectangular areas with sides of a ratio of 1:2 to be collectively stored in separate page regions.

In the memory consolidated image processing LSI with the above described construction, the memory part may comprise a dynamic random access memory (DRAM). Alternatively, in the memory consolidated image processing LSI with the above described construction, the memory part may comprise a ferroelectric random access memory (FeRAM). Alternatively, in the memory consolidated image processing LSI with the above described construction, the memory part may comprise a magnetoresistance random access memory (MRAM).

In the memory consolidated image processing LSI according to the first basic construction, the image access part may be a circuit for processing a bit stream based on a dynamic image compressing standard, such as MPEG-4, MPEG-2, MPEG-1 or H.263, and the memory part may be a memory having a unit for the preparation for reading, i.e., a region corresponding to the page region in a DRAM, the size of the page range on the image plane being preferably in the range of from 64 pixels to 512 pixels, or in the range of from 512 pixels to 1024 pixels.

In the memory consolidated image processing LSI according to the first basic construction, the image access part may be a circuit for processing a bit stream based on a dynamic image compressing standard, such as MPEG-4, MPEG-2, MPEG-1 or H.263, and the memory part may be a memory having a unit corresponding to a data bus, i.e., the word region corresponding to a word region in a DRAM, the size of the word range on the image plane being preferably in the range of from 8 pixels to 64 pixels, or in the range of from 64 pixels to 256 pixels.

According to a second basic construction of the present invention, an image processing system having an image compressing and/or expanding unit for compressing and/or expanding image information, includes a memory consolidated image processing LSI comprising: a memory part having a plurality of lattice-like page ranges for storing the image data of the page ranges which are formed by segmenting an image plane corresponding to a display screen and each of which has sides a power of 2 long, and a plurality of word ranges for storing the image data of the word ranges which are formed by segmenting each of the page ranges and which are assembled to constitute each of the page ranges; and an image access part for accessing the word ranges after accessing the page ranges by a pre-charge in order to access the memory part.

In the image processing system according to the second basic construction, each of the page ranges and each of the word ranges in the memory part of the memory consolidated image processing LSI may be set to be a desired page range and a desired word range, which allow desired image data to be accessed at the minimum power consumption by the minimum number of pre-charges and the minimum number of charges.

The image processing system according to the second basic construction may further comprise: a raster converting part for raster-converting the image information; and a processing part for converting the image data, which has been converted by the raster converting part, into data corresponding to the desired page and word ranges, wherein the memory consolidated image processing LSI stores the image data for the desired page and word ranges, which has been converted by the processing part, in the page and word regions of the memory part, and the image access part accesses by word-accessing the desired word region after being pre-charged in the desired page region of the memory part.

The image processing system according to the second basic construction may further comprise: a raster converting part for raster-converting the image information; a temporary memory part for temporarily storing the image data which has been converted by the raster converting part; and a processing part for converting the image data, which has been stored in the temporary memory part, into data corresponding to the desired page and word ranges, wherein the memory consolidated image processing LSI stores the desired page and word ranges, which have been converted by the processing part, in the page and word regions of the memory part, and the image access part accesses the desired word region after being pre-charged in the desired page region of the memory part.

The image processing system according to the second basic construction may further comprise an MPEG processing part for compression-coding image data using an MPEG coding system, wherein the memory consolidated image processing LSI stores the desired page and word ranges for the image data, which has been processed by the MPEG processing part, in the memory part, and the image access part accesses by word-accessing the desired word region after being pre-charged in the desired page range of the memory part.

In the image processing system according to the second basic construction, the image access part may be a circuit for processing a bit stream based on a dynamic image compressing standard, such as MPEG-4, MPEG-2, MPEG-1 or H.263, and the memory part may be a memory having the page region corresponding to the page range serving as a unit for the preparation for reading, the size of the page range on the image plane being preferably in the range of from 64 pixels to 512 pixels.

In the image processing system according to the second basic construction, the image access part may be a circuit for processing a bit stream based on a dynamic image compressing standard, such as MPEG-4, MPEG-2, MPEG-1 or H.263, and the memory part may be a memory having the page region corresponding to the page range serving as a unit for the preparation for reading, the size of the page range on the image plane being preferably in the range of from 512 pixels to 1024 pixels.

In the image processing system according to the second basic construction, the image access part may be a circuit for processing a bit stream based on a dynamic image compressing standard, such as MPEG-4, MPEG-2, MPEG-1 or H.263, and the memory part may be a memory having the word region corresponding to the word range as a unit corresponding to a data bus, the size of the word range on the image plane being preferably in the range of from 8 pixels to 64 pixels.

In the image processing system according to the second basic construction, the image access part may be a circuit for processing a bit stream based on a dynamic image compressing standard, such as MPEG-4, MPEG-2, MPEG-1 or H.263, and the memory part may be a memory having the word region corresponding to the word range as a unit corresponding to a data bus, the size of the word range on the image plane being preferably in the range of from 64 pixels to 256 pixels.

According to a third basic construction of the present invention, there is provided a method for processing image data stored in a memory consolidated image processing LSI, which comprises a memory part for storing predetermined image data and having page regions each storing page ranges so that an image plane corresponding to a display screen is segmented into lattice-like ranges each of which has sides a power of 2 long, and a word regions each storing word ranges which are formed by segmenting the page range on the image plane, and an access part for accessing to the memory part in the manner that a multiplied value of a power consumption per one of pre-charges in a power consumption model of a memory by an average number of the pre-charges is a substantially minimum value and that a multiplied value of a power consumption per one of word accesses in a power consumption model of a memory by an average number of the word accesses is a substantially minimum value, the method comprising: a step of accessing in a first stage by pre-charging to the page region of the memory part in which desired data are stored; a step of accessing in a second stage by ward accessing to the word regions of the memory part in which desired data are stored; a step of reading out the desired data from the memory part; and a step of performing predetermined image processing to image data which are read in the manner that a multiplied value of a power consumption per one of pre-charges in a power consumption model of a memory by an average number of the pre-charges is a substantially minimum value, or a multiplied value of a power consumption per one of word accesses in a power consumption model of a memory by an average number of the word accesses is a substantially minimum value.

In the image data processing method according to the third basic construction, the page region in the memory part is set to have a size so that the multiplied value of the power consumption per one of the pre-charges in a power consumption model of a memory by an average number of pre-charges is the substantially minimum value.

In the image data processing method according to the third basic construction, the word region in the memory part is set to have a size so that the multiplied value of a power consumption per one of word accesses in a power consumption model of a memory by an average number of the word accesses is the substantially minimum value.

In the image data processing method according to the third basic construction, the page region in the memory part is set to have a size so that the multiplied value of the power consumption per one of the pre-charges in a power consumption model of a memory by an average number of pre-charges is the substantially minimum value, and the word region in the memory part is set to have a size so that the multiplied value of a power consumption per one of word accesses in a power consumption model of a memory by an average number of the word accesses is the substantially minimum value.

According to a fourth basic construction of the present invention, there is provided method for designing a memory consolidated image processing LSI, which comprises a memory part for storing predetermined image data, and an access part for accessing the image data stored in the memory part by using two-stage accesses, in which the method comprises: a step of setting a plurality of page ranges so that an image plane corresponding to a display screen is segmented into lattice-like ranges, each of which has sides a power of 2 long, and so that the multiplied value of the power consumption per one of the pre-charges in a power consumption model of a memory by an average number of pre-charges is the substantially minimum value; a step of setting a page region capable of storing the image data for a page range on the image plane in the memory part; a step of setting a plurality of word ranges which are formed by segmenting the page range on the image plane so that the multiplied value of a power consumption per one of word accesses in a power consumption model of a memory by an average number of the word accesses is the substantially minimum value; a step of setting a word region capable of storing the word ranges on the image plane in the page region in the memory part; and a step of storing the image data to be stored by allotting the data into each of the page regions and word regions in the memory part by using a unit of the page ranges and word ranges in the image plane.

BRIEF DESCRIPTION OF THE DRAWINGS

In the drawings:

FIG. 7 is a characteristic diagram for deriving an expected value of power consumption;

FIG. 8 is a characteristic diagram showing an expected value of power consumption for a page access in the first preferred embodiment;

FIG. 15 is a schematic diagram showing the operation of the third preferred embodiment of a memory consolidated image processing LSI;

FIG. 16 is a block diagram showing the fourth preferred embodiment of a memory consolidated image processing LSI according to the present invention, which is applied to an MPEG camera;

DESCRIPTION OF THE PREFERRED EMBODIMENTS

Referring now to the accompanying drawings, the preferred embodiments of a memory consolidated image processing LSI according to the present invention will be described below in detail. FIGS. 2 through 10 are block, schematic and characteristic diagrams showing the construction, operation and effects of the first preferred embodiment of a memory consolidated image processing LSI according to the present invention. In the description of the preferred embodiments of the present invention, a DRAM will be described as an example of a memory. However, the present invention can be applied to other types of memories, such as FeRAMs and MRAMs, which carries out two-stage accesses of a page access and a word access.

Figure 1A:
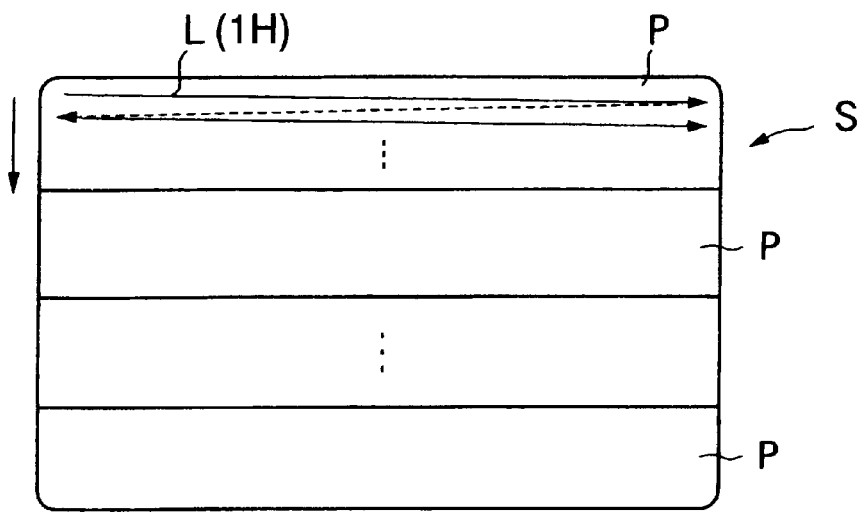
FIG. 1A is an illustration schematically showing page regions and word regions on an image plane stored in a conventional memory consolidated image processing LSI.
Figure 1B:
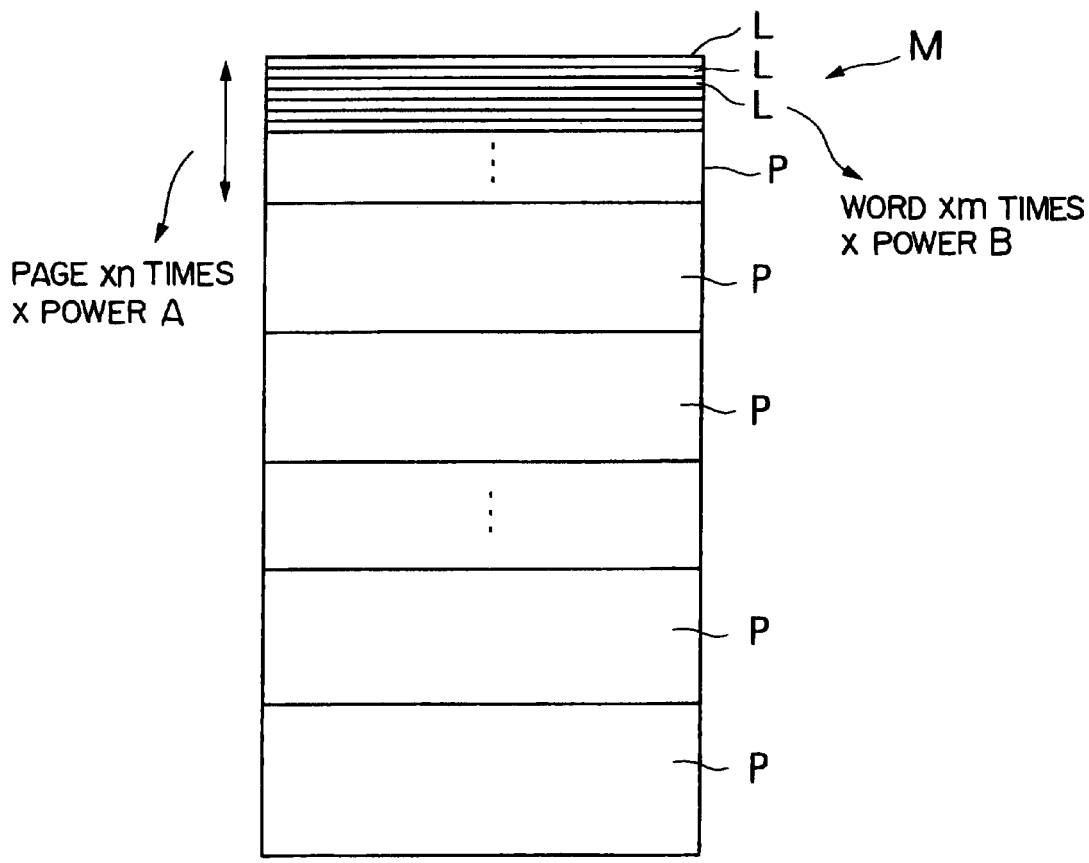
FIG. 1B is an illustration schematically showing a stored state in the conventional memory.
Figure 2:
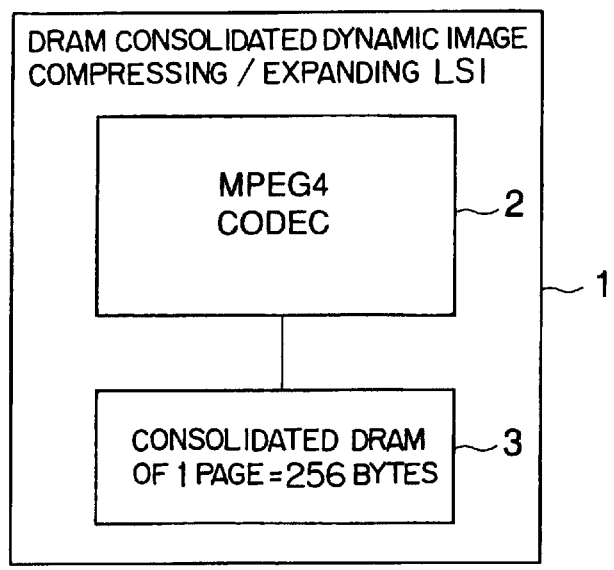
FIG. 2 is a block diagram showing the first preferred embodiment of a memory consolidated image processing LSI according to the present invention.

As shown in FIG. 2, the first preferred embodiment of a memory consolidated image processing LSI according to the present invention is a CODEC LSI for MPEG-4, and comprises an MPEG-4 CODEC 2 and a consolidated DRAM 3. The consolidated DRAM 3 is designed to store therein predetermined dynamic image data, and the CODEC 2 is designed to compress and expand the dynamic image data. The page size of the consolidated DRAM 3 is 256 bytes per page. However, the page size should not be limited to 256 bytes if it is in the range of from 62 to 512 bytes. For example, the page size may be an image of 128 bytes of "8×16" pixels.

Figure 3:
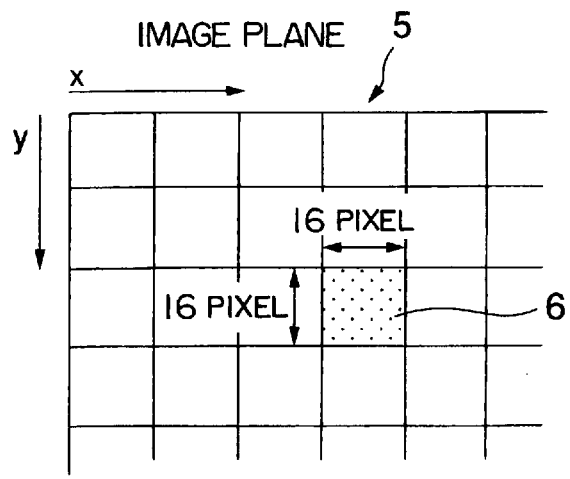
FIG. 3 is a schematic diagram showing the operation of the first preferred embodiment of a memory consolidated image processing LSI according to the present invention.

The MPEG-4 CODEC 2 may be another dynamic image compressing or expanding CODEC for carrying out a motion compensation for each macro block or each block, such as MPEG-1, MPEG-2 or H.263. This CODEC 2 may be another CODEC if it is an image processing circuit capable of accessing a substantially square image of 16 pixels×16 pixels shown in FIG. 3 from random coordinates. The image cut out of an image plane by the CODEC 2 to be stored in the DRAM 3 as an image of a page region can be grasped as an image of a page range 6 with respect to an image plane 5 as shown in FIG. 3. The page range 6 has a size of "16×16" pixels, and the luminance/chrominance component of one pixel corresponds to 1 byte. Therefore, 1 byte corresponds to one pixel on the luminance/chrominance plane, so that 256 pixels correspond to 256 bytes.

Therefore, in the first preferred embodiment of a memory consolidated image processing LSI according to the present invention, the range of pixels processed on one page is the range of 256 pixels, and after the page range 6 of 256 pixels is accessed, a required word in a word range (not shown) constituting the page range 6 is read to process an image. In this first preferred embodiment, the page range 6 is a square page range of "16×16" pixels as shown in FIG. 3, or a rectangular page range of 2:1 or 1:2 of "16×8" pixels or "8×16" pixels.

Since image data processed in such a square or rectangular lattice-like range can not be outputted after being segmented into lattices as the size of image information, image data inputted from information source, such as a digital camera, may be stored once in a memory by a conventional system. Therefore, in order to process the image data, it is advantageous to an image processing to rewrite and store the image data in a memory having page and word regions corresponding to the lattice-like page and word ranges. The present invention has aimed at this point to set page and word regions of a memory suitable for an image processing.

Referring to FIGS. 4 through 10, the effects of the first preferred embodiment of a memory consolidated image processing LSI according to the present invention with the above described construction will be described below in detail.

In such a memory consolidated image processing LSI in the first preferred embodiment, an image in the page range 6 corresponding to the image plane 5 shown in FIG. 3 is accessed from random coordinates, and a substantially square image of "16×16" pixels or a substantially rectangular image of 1:2 of "8×16" pixels is stored in a page region of a memory region. In this case, the size of a page is set so as to increase the possibility that the power consumed in pre-charge in the row directions of the DRAM 3 is statistically minimum. The details of this preferred embodiment will be described below.

The DRAM has an access unit which is a page, which is an access unit in the first stage of the two-stage accesses. In order to access one page, it is required to issue the optimum command for the DRAM. The power cost of one access can be approximated by the following expression:

Unit Power Consumption=$A(B \cdot \text{Page Size}+C)$ wherein A, B and C are constants determined for a DRAM having a certain capacity.

Figure 4:
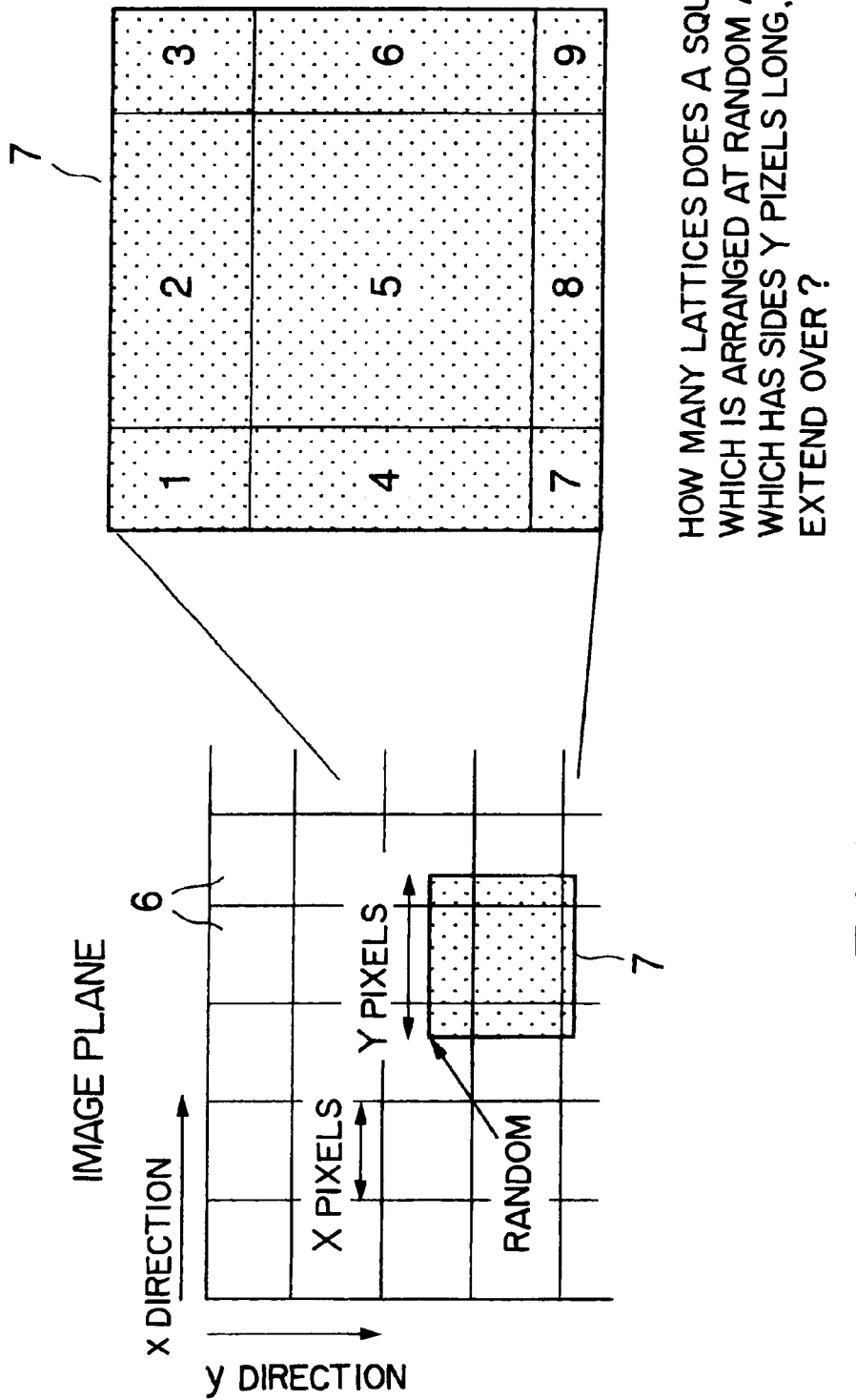
FIG. 4 is a schematic diagram for explaining effects in the first preferred embodiment.

It is assumed that the segmental unit of a page is square in order to simplify explanation. As shown in FIG. 4, an image plane is segmented into square page ranges 6 with a side of X pixels, and each of the squares is stored so as to correspond to a page of the DRAM. From this plane, a square image 7 with a side of Y pixels is read out on the basis of the position from the origin having optional coordinates (random). In the example of FIG. 4, the image 7 extends over nine lattices (segmented regions). Therefore, only the issuance of the command consumes a power nine time as many as the unit power consumption. When the coordinates of the origin are random ones, an expected value of the number of lattices over which the image extends is derived as follows.

Figure 5:
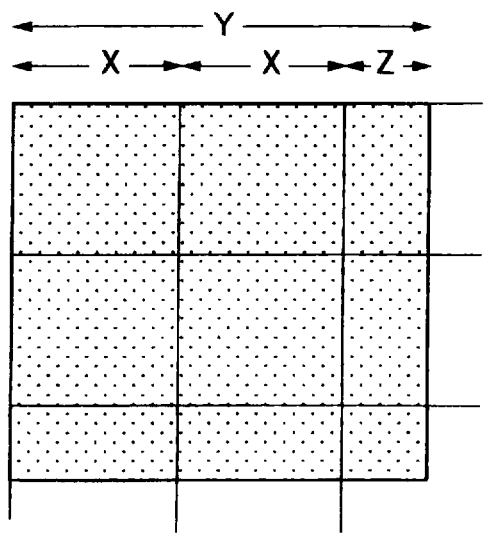
FIG. 5 is a schematic diagram for explaining parameters for calculating an expected value in the first preferred embodiment.
Figure 6:
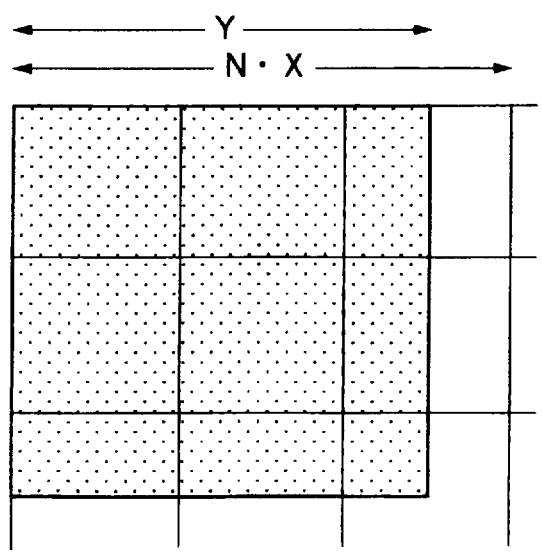
FIG. 6 is a schematic diagram for explaining parameters for calculating an expected value in the first preferred embodiment.

The expected value of the number of lattices is determined by a parameter Z which is a parameter for calculating the expected value and which meets the expression "$Y=M \cdot X+Z$ (M is 0 or a positive integer, and Z is an integer in the range of from 1 to X)" shown in FIG. 5 or the expression "$(N-1) \cdot X < Y \leq N \cdot X$ (N is an natural number)" shown in FIG. 6. When the parameter is thus defined, the expected value VE of the number of lattices over which the image extends is calculated by the following expression.

$VE = \{(Z-1)^2(N+1)^2 + 2(Z-1)(X-Z+1)N(N+1) + (X-Z+1)^2 N^2\}/X^2$

When Y is read once, the power penalty is "Expected Value of Number of Extended Lattices×Unit Power Consumption".

In image processing LSIs, there are some cases where a very large number of such processes are carried out. Particularly in dynamic image compressing or expanding LSIs for carrying out a motion compensation, there are some cases where most of accesses are occupied by the above described processes. When the motion compensation is carried out, the basic image is a block of 8×8 pixels or a macro block of 16×16 pixels, so that Y is 8 or 16. In the expression for deriving the power consumption, A can be ignored since it is a coefficient, and the ratio of B and C is often approximately "B:C=1:100~1000" when the page size in the expression is expressed by bytes. On such conditions, X capable of extremely reducing the power consumption is derived (N and Z can be calculated from X).

As a result, a characteristic diagram shown in FIG. 7 is obtained. As can be seen from this characteristic diagram, the power consumption is effectively reduced when X is in the range of from 8 to 32 about the number of pixels of 16. This is a page size which is in the range of from 64 bytes to 512 byte per page. It is considered that the page size of this range is effective in the decrease of power consumption when the image of the square region of "16 pixels×16 pixels" is read.

FIG. 8 shows power consumption plotted when a square image of "8 pixels×8 pixels" is read, similar to FIG. 7. Also in this case, the power consumption is effectively reduced when one page is set to be in the range of from 64 bytes to 512 bytes. Also in this case, the ratio of parameters B and C in the power consumption model of the DRAM is approximately "B:C=1:100~1000", similar to FIG. 7.

That is, when images of "8 pixels×8 pixels" or "16 pixels×16 pixels" arranged at random positions are frequently accessed from images arranged on the DRAM, the possibility that it is advantageous to use a DRAM having 64 bytes to 512 bytes per page is high. Also when an image having a similar shape is stored or accessed, the same effect can be obtained in such a range of page construction.

Referring to FIGS. 9 through 14, the second preferred embodiment of a memory-consolidated image-processing LSI according to the present invention will be described below. In the first preferred embodiment, the page size has been defined, whereas in this second preferred embodiment, a word size is defined. At this point, the memory-consolidated image processing LSI in the second preferred embodiment is different from that in the first preferred embodiment. The word is an access unit in the second stage of the two-stage accesses.

Figure 9:
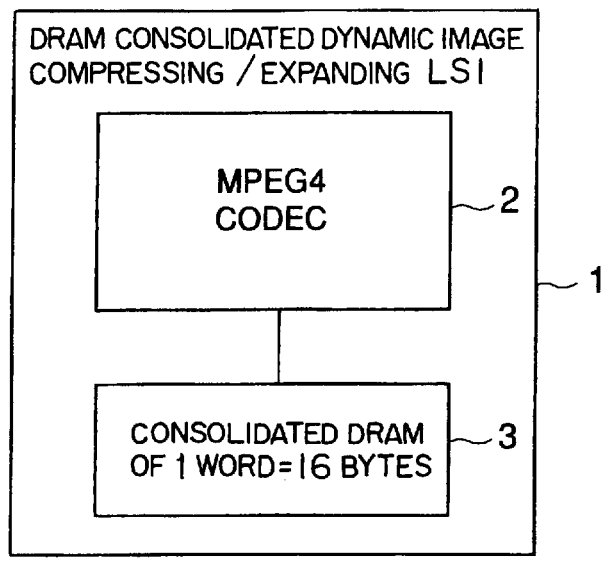
FIG. 9 is a block diagram showing the second preferred embodiment of a memory consolidated image processing LSI according to the present invention.

In FIG. 9, the memory consolidated image processing LSI 1 comprises an MPEG-4 CODEC 2, and a DRAM 3 having a word size of 16 bytes. The difference between this preferred embodiment and the first preferred embodiment that the size of data stored in the DRAM 3 is set to be 16 bytes per one word although it is set to be 256 byte per one page in the first preferred embodiment. In this second preferred embodiment, the size of one word is 16 bytes as an example, but it may be in the range of from 8 bytes to 64 bytes, preferably the number of bytes which is a power of "8". Similar to the first preferred embodiment, the portion of the MPEG-4 CODEC 2 in FIG. 9 may be adapted to other standards, such as MPEG-1, MPEG-2 and H.263, or may be another kind of dynamic image compressing or expanding CODEC for carrying out a motion compensation every block. The CODEC may have another construction if it is an image processing circuit for accessing a substantially square image with a side of 8 pixels or 16 pixels from random coordinates.

Figure 10:
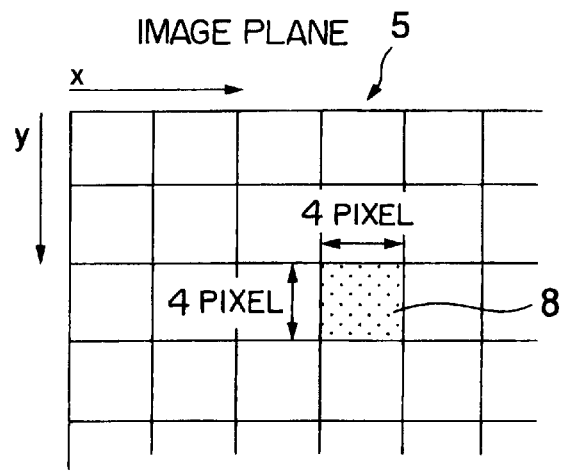
FIG. 10 is a schematic diagram showing the operation of the second preferred embodiment of a memory consolidated image processing LSI according to the present invention.

The consolidated DRAM 3 of the memory consolidated image processing LSI in the second preferred embodiment shown in FIG. 9 is segmented into square areas, each of which has the same capacity as that of the word, or rectangular areas with sizes 1:2 length, for storing data in different words. Specifically, as shown in FIG. 10, it is addressed so that regions 8 having a size of "4 pixels×4 pixels" are stored in x and y directions with respect to the image plane 5. Therefore, in FIG. 10, the segmented images of square regions, each of which has a size of "4 pixels×4 pixels", are word ranges 8, so that the word has a size of 16 bytes.

Figure 11:
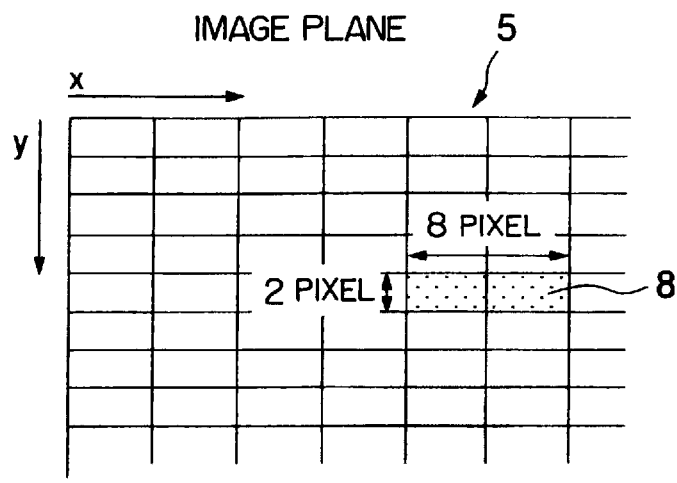
FIG. 11 is a schematic diagram showing the operation of the second preferred embodiment of a memory consolidated image processing LSI according to the present invention.

While the memory consolidated image processing LSI in the second preferred embodiment has been designed to store data of 16 bytes as a word in the word range 8 of "4 pixels×4 pixels" as shown in FIG. 10, the present invention should not be limited thereto. For example, as shown in FIG. 11, the image plane 5 may be segmented into rectangular word ranges 8 corresponding to regions of "8 pixels×2 pixels" on a two-dimensional plane of the image plane 5 stored in the consolidated DRAM 3. Also in this case, data stored in the consolidated DRAM 3 has a word size of 16 bytes, and the image is segmented into rectangular regions of "8 pixels×2 pixels" to store data every word.

Figure 12:
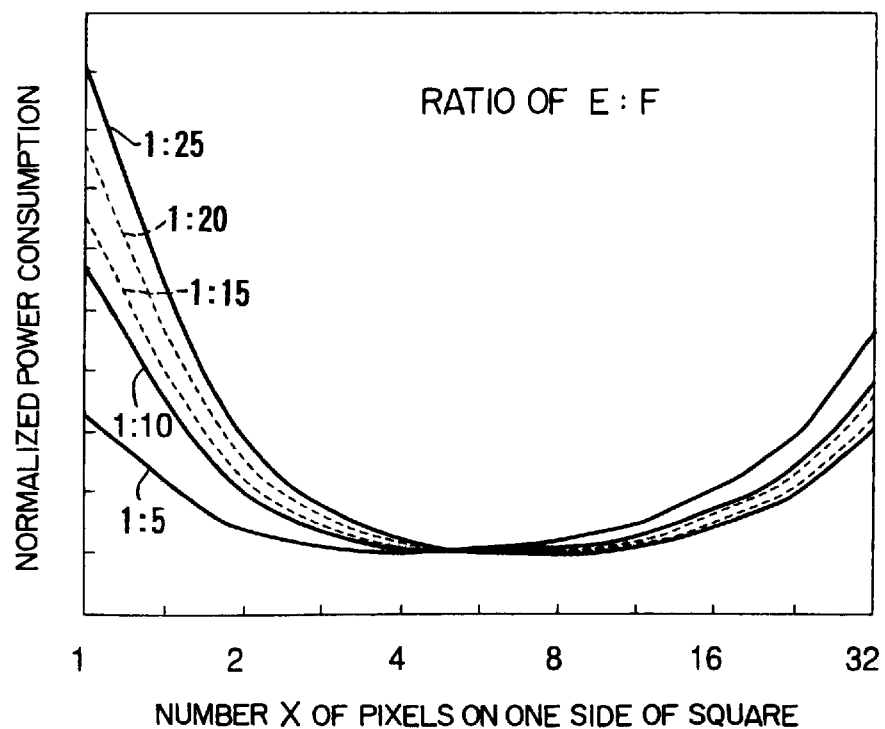
FIG. 12 is a characteristic diagram showing an expected value of power consumption for a page access in the second preferred embodiment.
Figure 13:
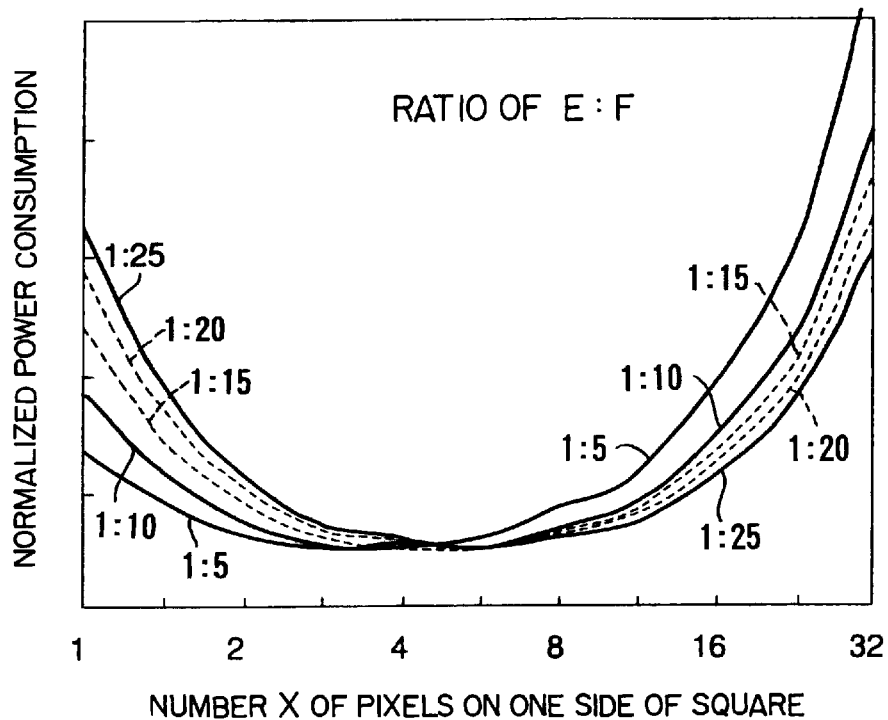
FIG. 13 is a characteristic diagram showing an expected value of power consumption for a page access in the second preferred embodiment.

Referring to FIGS. 12 and 13, the operation and effects of the memory-consolidated image processing LSI in the second preferred embodiment will be described below. In the memory consolidated image processing LSI in the second preferred embodiment, the size of a page may be set so as to increase the possibility of statistically minimizing the power consumption when a substantially square image with a side of about 8 pixels to 16 pixels, which is often used for an image processing such as a motion compensation, is accessed from the DRAM by the word on the basis of random coordinates. In this case, the word is an access unit when the DRAM is accessed. In order to access one word, it is required to issue an appropriate command for the DRAM. The electric cost of the issuance of the command can be approximated by the following expression:

$$\text{Unit Power Consumption} = D(E \cdot \text{Word Size} + F)$$

wherein D, E and F are constants determined with respect to a certain capacity.

In order to simplify the explanation of the above described embodiment, the image is segmented into squares. As shown in FIG. 4, an image plane may be segmented into square ranges with a side of X pixels. It is assumed that each of the squares is stored so as to correspond to a word of the DRAM. It is assumed that from this plane, a square image with side Y pixels long is read out on the basis of the position from the origin having optional coordinates. Similar to the setting of the region of a page in which a page access is carried out, Z and N can be defined. Thus, the expected value VE of the number of lattices over which the image extends is derived by the following expression.

$$VE = \{(Z-1)^2(N+1)^2 + 2(Z-1)(X-Z+1)N(N+1) + (X-Z+1)^2 N^2\}/X^2$$

In the expression for deriving the power consumption, if D is ignored since it is a coefficient, and if the word size is expressed by bytes, the ratio of "E:F" is often approximately in the range of from "1:5" to "1:25".

FIG. 12 shows characteristics of the length of a side of a cut image, i.e., Y, when Y=16, and FIG. 13 shows the characteristics when Y=8. These characteristic diagrams show normalized power consumption plotted with respect to the length X of a side of an image corresponding to a page. It can be seen that the normalized power consumption has substantially minimum values when the length X is in the range of 2 pixels or 4 pixels to 8 pixels. This means that the possibility that the use of a DRAM having a word size of 8 bytes to 64 bytes is advantageous to save power consumption is high. Also when an image having a similar shape or area is stored or accessed, the same effect can be obtained in such a range of page construction. FIG. 12 shows a case where a partial image of "16 pixels×16 pixels" is accessed at random, and FIG. 13 shows a case where a partial image of "8 pixels×8 pixels" is accessed at random.

In a first case where the size of a page is a power of "4", the optimum shape of the partial image stored in the page region is square. In a second case where the size of a page is twice as many as a power of "4", a rectangle of "1:2" or "1:4" is preferred next to the first case as the shape of the partial image which is easy to be collectively stored.

If an image has been segmented into regions which are rectangles having a width of 8 pixels in lateral directions and which have a storage capacity equal to the size of a word, when the image of a block size (8 pixels×8 pixels) is accessed, the image is stored in regions, the addresses of which are continuous, so that the address producing cost is small to allow the image to be easily accessed. Also, if an image has been segmented into regions which are rectangles having a width of 16 pixels in lateral directions and which have a storage capacity equal to the size of a word, when the image of a macro block size (16 pixels×16 pixels) is accessed, the image is stored in regions, the addresses of which are continuous, so that the address producing cost is small to allow the image to be easily accessed.

Figure 14:
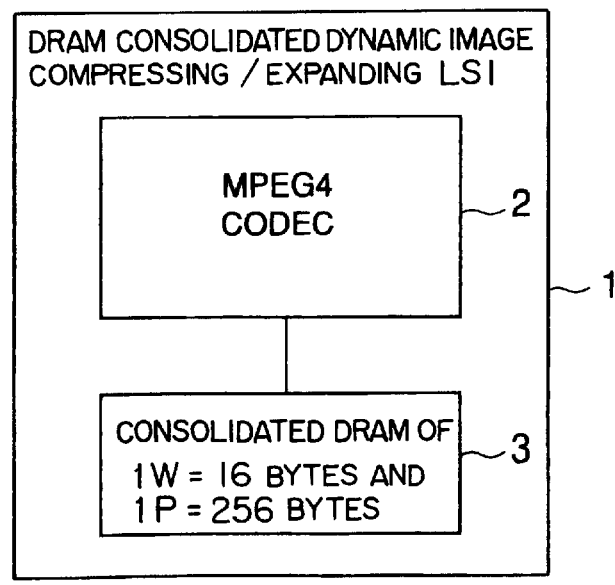
FIG. 14 is a block diagram showing the third preferred embodiment of a memory consolidated image processing LSI according to the present invention.

Referring to FIGS. 14 and 15, the third preferred embodiment of a memory consolidated image processing LSI according to the present invention will be described below. As shown in FIG. 14, the memory consolidated image processing LSI in the third preferred embodiment has the same construction as the LSI 1 in the first and second preferred embodiments, and comprises an MPEG-4 CODEC 2 and a consolidated DRAM 3. The construction of the consolidated DRAM 3 is a combination of data storage forms of the consolidated DRAMs in the first and second preferred embodiments. At this point, the third preferred embodiment is different from the first and second preferred embodiments. That is, in FIG. 14, the consolidated DRAM 3 is set so as to have a size of 16 bytes per word and a capacity of 256 bytes per page.

FIG. 15 shows an example wherein data is stored in the DRAM 3 having a page size of 256 bytes and a word size of 16 bytes. In FIG. 15, as the storage region of the DRAM 3 corresponding to the image plane 5, 16 word ranges 8 of 16 bytes are assembled to form a page range 6 for one page, and the page range 6 has a size of "16 pixels×16 pixels" of 256 bytes.

Therefore, when image data for one frame is intended to be accessed by a motion compensation processing or the like, the image data for one page of 16 pixels in x directions and 16 pixels in y directions is first accessed, and then, the image data for one word of 8 pixels in x directions and 2 pixels in y directions is accessed, so that it is possible to efficiently store and read DRAM stored image data having the optimum size, together with page data and word data, at a low power consumption.

As described above, by combining the improvement of the setting of the shape and size of an image range with respect to a word system with the improvement of the setting of the shape and size of an image range with respect to a page system, the combined effects can be obtained in addition to the effects of the respective improvements.

While the memory part has comprised the dynamic random access memory (DRAM) in the above described memory consolidated image processing LSIs in the first through third preferred embodiments, the present invention should not be limited thereto. If the memory consolidated image processing LSI has page and word regions as a memory region and has the above described construction for carrying out two-stage accesses that a word access is carried out after a page access is carried out, the memory part may comprises a ferroelectric random access memory (FRAM) or a magnetoresistance random access memory (MRAM).

Figure 17:
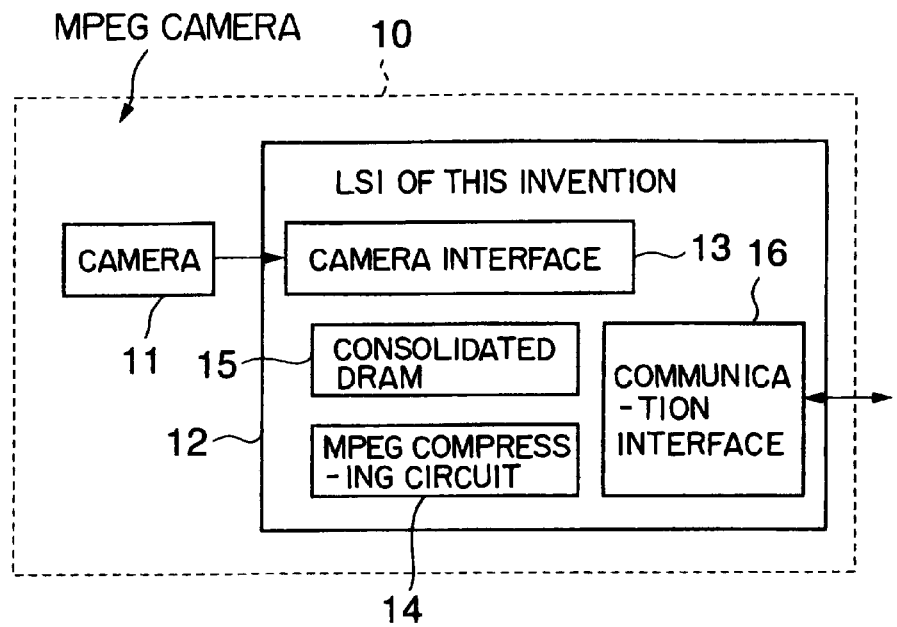
FIG. 17 is a block diagram showing the fifth preferred embodiment of a memory consolidated image processing LSI according to the present invention, which is applied to an MPEG camera.
Figure 18:
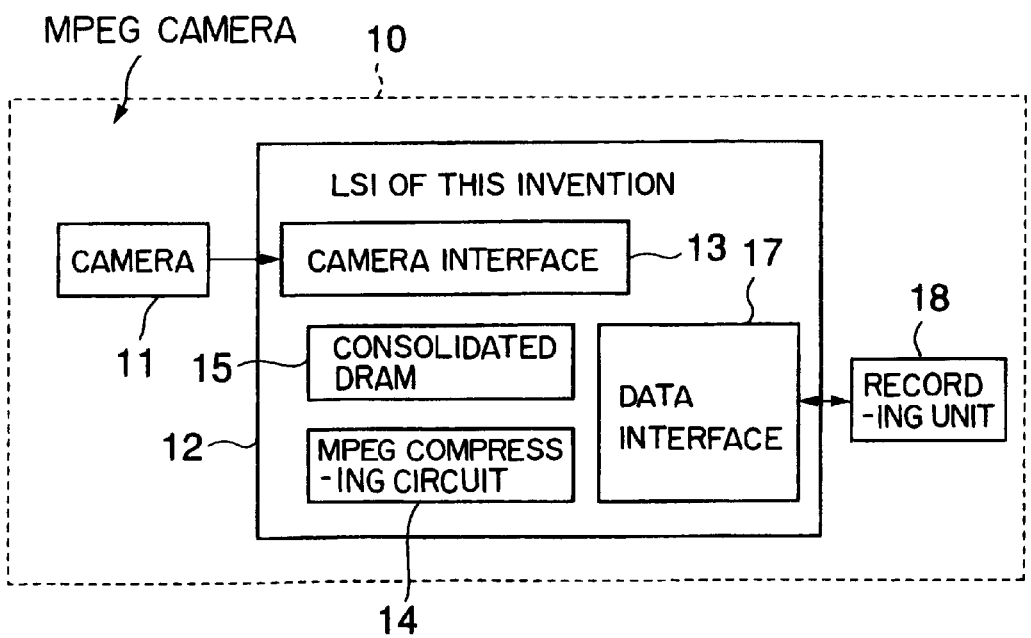
FIG. 18 is a block diagram showing the sixth preferred embodiment of a memory consolidated image processing LSI according to the present invention, which is applied to an MPEG camera.

While the internal construction of the consolidated DRAM 3 constituting the LSI 1 has been described in the first through third preferred embodiment, the fourth through sixth preferred embodiments of the present invention to which a memory consolidated image processing LSI according to the present invention is applied will be described referring to FIGS. 16 through 18.

FIG. 16 is a block diagram showing the fourth preferred embodiment of a memory consolidated image processing LSI according to the present invention, which is applied to an MPEG camera as an example of an image processing system, particularly a portable electronic apparatus capable of being driven by a battery. In FIG. 16, an MPEG camera 10 comprises a camera 11 and a memory consolidated image processing LSI 12. The LSI 12 comprises a camera interface 13, an MPEG compressing circuit 14 and a consolidated DRAM 15 with the construction in any one of the first through third preferred embodiments. The camera interface 13, the MPEG compressing circuit 14 and the consolidated DRAM 15 constitute a large scale integrated circuit. The basic construction of the memory consolidated image processing LSI in the fourth preferred embodiment is the same as those of the memory consolidated image processing LSIs in the first through third preferred embodiment, except that the camera interface 13 is added. Furthermore, image data to be outputted from the camera are not outputted while the image size is segmented into lattice-like parts. In such a case, after the image data are temporarily stored in the memory, the rearrangement of images stored so that the image data segmented into lattice-like parts correspond to a page region of the memory may be carried out.

According to the MPEG camera in the fourth preferred embodiment, the memory consolidated image processing LSI 12 further comprises the camera interface 13 in addition to the MPEG compressing circuit 14 and the consolidated DRAM 15. Therefore, if the LSI 12 is applied to, e.g., an image control part of the camera 11 with substantially the same construction as that of a conventional camera, there is a peculiar advantage in that it is possible to easily provide the MPEG camera 10.

As a similar example of application to that in the fourth preferred embodiment, a communication interface may also be mounted on the same chip as the fifth preferred embodiment of an MPEG camera according to the present invention. FIG. 17 is a block diagram showing the construction of the fifth preferred embodiment of an MPEG camera according to the present invention. In this figure, an MPEG camera 10 comprises a camera 11 and a memory consolidated image processing LSI 12. In the LSI 12, a camera interface 13, an MPEG compressing circuit 14, a consolidated DRAM 15 and a communication interface 16 for transmitting an image picked up by the MPEG camera to the outside are mounted on the same chip.

Therefore, according to the MPEG camera 10 in the fifth preferred embodiment, there is a peculiar advantage in that the image picked up by the camera can be transmitted to the outside via the communication interface 16. While the communication interface 16 has been mounted on the same chip as that for the memory consolidated image processing LSI 12, the present invention should not be limited thereto. The communication interface 16 may be formed as a separate chip to be connected to the MPEG compressing circuit 14 via data transmitting/receiving wiring. In addition, an MPEG compression signal received via the communication interface may be expanded by an MPEG expanding circuit (not shown) to display an image on a monitor (not shown). Also to such an image expanding processing, the memory access construction of the present invention can be applied.

As a similar example of application to those in the fourth and fifth preferred embodiment, a recording unit may be provided as the sixth preferred embodiment of an MPEG camera according to the present invention. FIG. 18 is a block diagram showing the construction of the sixth preferred embodiment of an MPEG camera according to the present invention. In this figure, an MPEG camera 10 comprises a camera 11, a memory consolidated image processing LSI 12, and a recording unit 18. The LSI 12 comprises a camera interface 3, an MPEG compressing circuit 14, a consolidated DRAM 15, and a data interface 17 for transmitting and receiving image data to and from the recording unit 18.

According to the MPEG camera 10 in the sixth preferred embodiment with such a construction, there is a peculiar advantage in that the picked-up image can be recorded in the recording unit 18, which is provided in the MPEG camera 10, by means of the data interface 17 mounted on the same chip, so that the functions of the MPEG compressing circuit and the consolidated DRAM, which are the features of the present invention, can also be given to the recorded image. Similar to the fifth preferred embodiment, only the data interface 17 may comprise a discrete circuit in the sixth preferred embodiment.

As described above, the memory consolidated image processing LSI according to the present invention can be applied to the MPEG camera in any one of the fourth through sixth preferred embodiment, and the present invention can reduce the power consumption when page and word data are accessed with respect to the consolidated DRAM, so that there is an excellent advantage in that it is possible to easily provide an excellent portable MPEG camera.

The application of a memory consolidated image processing LSI according to the present invention should not be limited to the MPEG camera, but the invention can be applied to all of image processing systems including a portable TV telephone. In addition, the memories to which the present invention is applied should not be limited to DRAMs, but the invention may be applied to FeRAMs and MRAMs if the memories are designed to carry out two-stage accesses as described above.

The first through third preferred embodiments of a memory consolidated image processing LSI according to the present invention may be mounted on the seventh preferred embodiment of an image processing system according to the present invention which will be described below.

Figure 19:
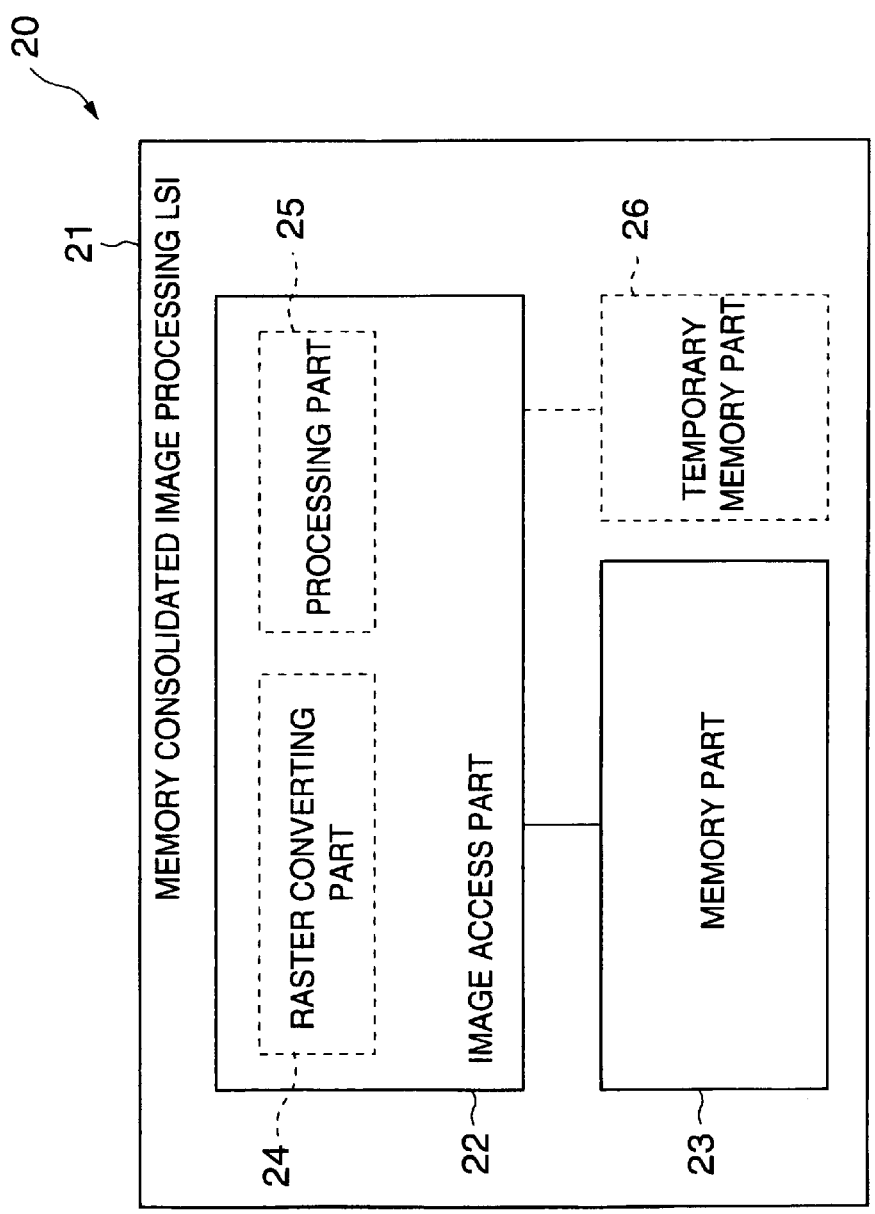
FIG. 19 is a block diagram showing the construction of the seventh preferred embodiment of an image processing system according to the present invention.

As shown in FIG. 19, an image processing system 20 in this seventh preferred embodiment has the image compressing and/or expanding function of compressing and/or expanding image information. The image processing system 20 comprises: a memory part 23 having a plurality of lattice-like page ranges for storing image data for the page ranges, which are formed by segmenting an image plane corresponding to a display screen and each of which has sides a power of 2 long, and a plurality of word regions for storing image data for a plurality of word ranges which are formed by segmenting each of the page ranges, the word regions being assembled to constitute the page region; and an image access part 22 for accessing the word ranges after accessing the page ranges by a pre-charge in order to access the memory part.

In the image processing system 20 in the seventh preferred embodiment, each of the page ranges and each of the word range in the memory part 23 of the memory consolidated image processing LSI 21 may a desired page range and a desired word range, which allow desired image data to be accessed at the minimum power consumption by the minimum number of pre-charges and the minimum number of charges.

As shown in FIG. 19, the image processing system 20 in the seventh preferred embodiment may further comprise: a raster converting part 24 for raster-converting the image information; and a processing part 25 for converting the image data, which has been converted by the raster converting part 24, into data corresponding to the desired page and word ranges, wherein the memory consolidated image processing LSI 21 stores the image data for the desired page and word ranges, which has been converted by the processing part 25, in the page and word regions of the memory part, and the image access part 22 word-accesses the desired word region after being pre-charged in the desired page region of the memory part.

The image processing system in the seventh preferred embodiment may further comprise: a raster converting part 24 for raster-converting the image information; a temporary memory part 26 for temporarily storing the image data which has been converted by the raster converting part 24; and a processing part 25 for converting the image data, which has been stored in the temporary memory part 25, into data corresponding to the desired page and word ranges, wherein the memory consolidated image processing LSI stores the desired page and word ranges, which have been converted by the processing part, in the page and word regions of the memory part, and the image access part 22 accesses the desired word region after being pre-charged in the desired page region of the memory part.

The image processing system in the seventh preferred embodiment may further comprise an MPEG processing part for compression-coding the image data using an MPEG coding system, wherein the memory consolidated image processing LSI stores the desired page and word ranges for the image data, which has been converted by the MPEG processing part, in the memory part, and the image access part word-accesses the desired word region after being pre-charged in the desired page range of the memory part.

In the image processing system in the seventh preferred embodiment, the image access part may be a circuit for processing a bit stream based on a dynamic image compressing standard, such as MPEG-4, MPEG-2, MPEG-1 or H.263, and the memory part may be a memory having the page region corresponding to the page range serving as a unit for the preparation for reading, the size of the page range on the image plane being preferably in the range of from 64 pixels to 512 pixels.

In the image processing system in the seventh preferred embodiment, the image access part may be a circuit for processing a bit stream based on a dynamic image compressing standard, such as MPEG-4, MPEG-2, MPEG-1 or H.263, and the memory part may be a memory having the page region corresponding to the page range serving as a unit for the preparation for reading, the size of the page range on the image plane being preferably in the range of from 512 pixels to 1024 pixels.

In the image processing system in the seventh preferred embodiment, the image access part may be a circuit for processing a bit stream based on a dynamic image compressing standard, such as MPEG-4, MPEG-2, MPEG-1 or H.263, and the memory part may be a memory having the word region corresponding to the word range serving as a unit corresponding to a data bus, the size of the word range on the image plane being preferably in the range of from 8 pixels to 64 pixels.

In the image processing system in the seventh preferred embodiment, the image access part may be a circuit for processing a bit stream based on a dynamic image compressing standard, such as MPEG-4, MPEG-2, MPEG-1 or H.263, and the memory part may be a memory having the word region corresponding to the word range serving as a unit corresponding to a data bus, the size of the word range on the image plane being preferably in the range of from 64 pixels to 256 pixels.

The eighth preferred embodiment of an image data processing method according to the present invention is a method for processing image data stored in a memory consolidated image processing LSI 21 shown in FIG. 19, which comprises a memory part 23 for storing predetermined image data and having page regions each storing page ranges so that an image plane corresponding to a display screen is segmented into lattice-like ranges each of which has sides a power of 2 long, and a word regions each storing word ranges which are formed by segmenting the page range on the image plane, and an access part 22 for accessing to the memory part in the manner that a multiplied value of a power consumption per one of pre-charges in a power consumption model of a memory by an average number of the pre-charges is a substantially minimum value and that a multiplied value of a power consumption per one of word accesses in a power consumption model of a memory by an average number of the word accesses is a substantially minimum value.

Figure 20:
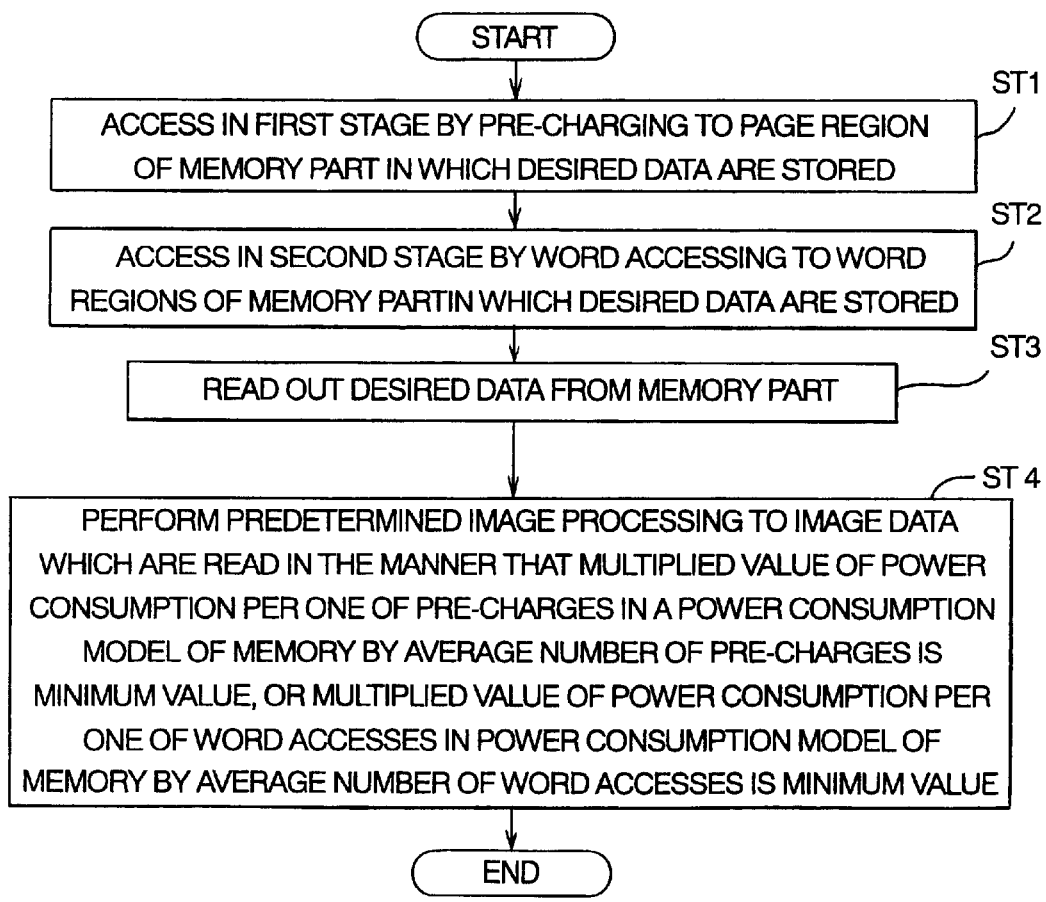
FIG. 20 is a flow chart showing the eighth preferred embodiment of an image processing method according to the present invention.

Specifically, as shown in FIG. 20, the method comprises: a step ST1 of accessing in a first stage by pre-charging to the page region of the memory part in which desired data are stored; a step ST2 of accessing in a second stage by ward accessing to the word regions of the memory part in which desired data are stored; a step ST3 of reading out the desired data from the memory part; and a step ST4 of performing predetermined image processing to image data which are read in the manner that a multiplied value of a power consumption per one of pre-charges in a power consumption model of a memory by an average number of the pre-charges is a substantially minimum value, or a multiplied value of a power consumption per one of word accesses in a power consumption model of a memory by an average number of the word accesses is a substantially minimum value.

The page region in the memory part is set to have a size so that the multiplied value of the power consumption per one of the pre-charges in a power consumption model of a memory by an average number of pre-charges is the substantially minimum value.

The word region in the memory part is set to have a size so that the multiplied value of a power consumption per one of word accesses in a power consumption model of a memory by an average number of the word accesses is the substantially minimum value.

The page region in the memory part is set to have a size so that the multiplied value of the power consumption per one of the pre-charges in a power consumption model of a memory by an average number of pre-charges is the substantially minimum value, and the word region in the memory part is set to have a size so that the multiplied value of a power consumption per one of word accesses in a power consumption model of a memory by an average number of the word accesses is the substantially minimum value.

The image processing performed in step ST4 includes various of processing such as a compression, decompression, motion vector compensation and the like of moving picture data.

Figure 21:
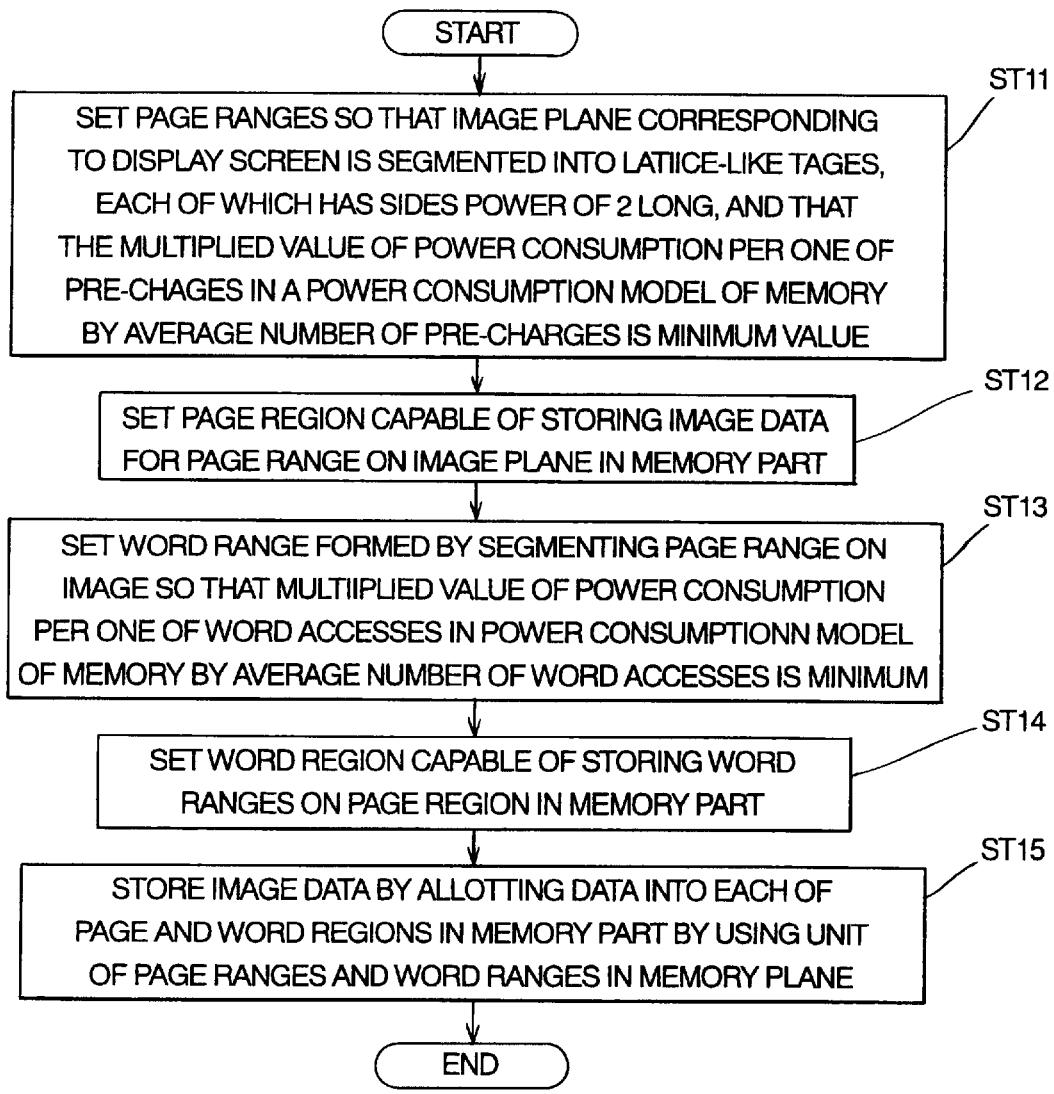
FIG. 21 is a flow chart showing the ninth preferred embodiment of a memory consolidated LSI designing method according to the present invention.

There is described a method for designing a memory consolidated image processing LSI according to the ninth embodiment of the present invention with reference to FIG. 21. The method for designing a memory consolidated image processing LSI, comprises a memory part for storing pre-determined image data, and an access part for accessing the image data stored in the memory part by using two-stage accesses. Specifically, the designing method comprises: a step ST11 of setting a plurality of page ranges so that an image plane corresponding to a display screen is segmented into lattice-like ranges, each of which has sides a power of 2 long, and so that the multiplied value of the power consumption per one of the pre-charges in a power consumption model of a memory by an average number of pre-charges is the substantially minimum value; a step ST12 of setting a page region capable of storing the image data for a page range on the image plane in the memory part; a step ST13 of setting a plurality of word ranges which are formed by segmenting the page range on the image plane so that the multiplied value of a power consumption per one of word accesses in a power consumption model of a memory by an average number of the word accesses is the substantially minimum value; a step ST14 of setting a word region capable of storing the word ranges on the image plane in the page region in the memory part; and a step ST15 of storing the image data to be stored by allotting the data into each of the page regions and word regions in the memory part by using a unit of the page ranges and word ranges in the image plane.

As described above in detail, according to the memory consolidated image processing LSI of the present invention, the image of the optimum range on a screen, which is easy to process the image of the page and word memory regions of the memory for carrying out two-stage accesses for storing the image plane, is divided into page range images and/or word range images to be stored. Therefore, there is an advantage in that it is possible to efficiently carry out reading when accessing a page storage image of a large power consumption, so that it is possible to reduce the power consumption which is required for reading image data from the consolidated DRAM.

Memory consolidated image processing LSIs mounted on portable electronics, which are often driven by a rechargeable battery, have heavy weight so as to be capable of being used for a long time. However, if the battery does not have a large memory capacity, it is possible to process an image at a low power consumption which can be sufficiently obtained by a usual battery, so that it is possible to provide a memory consolidated image processing LSI suitable for practical use.

What is claimed is:

1. A memory consolidated image processing LSI comprising:
   a memory part including a page region for storing image data for a plurality of lattice-like page ranges which are formed by segmenting an image plane corresponding to a display screen and each of which has sides each having a length of a power of 2, namely $2^n$ (n=1, 2, 3 . . . ), and word regions, each of which stores image data for a plurality of word ranges formed by segmenting each of said page ranges and which are assembled to constitute said page region; and
   an image access part for word-accessing said word ranges after said page ranges by a pre-charge in order to access said memory part,
   wherein said page region or said word region stored in said memory part is set so as to have a multiplied value of a power consumption per one of pre-charges in a power consumption model of a memory by an average number of the pre-charges to be a substantially minimum value, or a multiplied value of a power consumption per one of word accesses in a power consumption model of a memory by an average number of the word accesses to be a substantially minimum value.

2. A memory consolidated image processing LSI as set forth in claim 1, wherein said page ranges on said image plane wherein image data is stored in said page region of said menory part has a size so that the multiplied value of a power consumption per one of said pre-charges in a power consumption model of a memory by an average number of pre-charges is the substantially minimum value.

3. A memory consolidated image processing LSI as set forth in claim 1, wherein said word ranges on said image plane wherein image data is stored in said word region of said memory part has a size so that the multiplied value of a power consumption per one of said word accesses in a power consumption model of a memory by an average number of word accesses is the substantially minimum value.

4. A memory consolidated image processing LSI as set forth in claim 1, wherein said page ranges on said image plane wherein image data is stored in said page region of said memory part has a size so that the multiplied value of a power consumption per one of said pre-charges in a power consumption model of a memory by an average number of pre-charges is the substantially minimum value, and
   said word ranges on said image plane wherein image data is stored in said word region of said memory part has a size so that the multiplied value of a power consumption per one of said word accesses in a power consumption model of a memory by an average number of word accesses is the substantially minimum value.

5. A memory consolidated image processing LSI as set forth in claim 1, wherein said image plane comprises a plurality of pixels, and said page ranges are formed by segmenting said image plane into rectangular ranges with sides 8 to 16 pixels long or in a rectangular range which has a size approximating to that of said square range and which has an aspect ratio of up to 1:2.

6. A memory consolidated image processing LSI as set forth in claim 5, wherein image data for a two-dimensional plane, which has been stored in said memory region, is segmented into square areas having the same capacity as that of said page range or rectangular areas with sides of a ratio of 1:2 to be collectively stored in separate page regions.

7. A memory consolidated image processing LSI as set forth in claim 1, wherein said image plane comprises a plurality of pixels, and said word ranges are formed by segmenting said image plane into rectangular ranges with sides 8 to 16 pixels long or in a rectangular range which has a size approximating to that of said square range and which has an aspect ratio of up to 1:2.

8. A memory consolidated image processing LSI as set forth in claim 7, wherein image data for a two-dimensional plane, which has been stored in said memory region, is segmented into square areas having the same capacity as that of said page range or rectangular areas with sides of a ratio of 1:2 to be collectively stored in separate page regions.

9. A memory consolidated image processing LSI as set forth in claim 1, wherein said memory part comprises any one of a dynamic random access memory (DRAM), a ferroelectric random access memory (FRAM), and a magnetoresistance random access memory (MRAM).

10. A memory consolidated image processing LSI as set forth in claim 1, wherein said image access part is a circuit for processing a bit stream based on a dynamic image compressing standard, such as MPEG-4, MPEG-2, MPEG-1 or H. 263, and said memory part is a memory having said page region corresponding to said page range serving as a unit for the preparation for reading, the size of said page range on said image plane being preferably in the range of from 64 pixels to 512 pixels.

11. A memory consolidated image processing LSI as set forth in claim 1, wherein said image access part is a circuit for processing a bit stream based on a dynamic image compressing standard, such as MPEG-4, MPEG-2, MPEG-1 or H. 263, and said memory part is a memory having said page region corresponding to said page range serving as a unit for the preparation for reading, the size of said page range on said image plane being preferably in the range of from 512 pixels to 1024 pixels.

12. A memory consolidated image processing LSI as set forth in claim 1, wherein said image access part is a circuit for processing a bit stream based on a dynamic image compressing standard, such as MPEG-4, MPEG-2, MPEG-1 or H. 263, and said memory part is a memory having a unit corresponding to a data bus, i.e., said word region corresponding to a word region in a DRAM, the size of said word range on said image plane being preferably in the range of from 8 pixels to 64 pixels.

13. A memory consolidated image processing LSI as set forth in claim 1, wherein said image access part is a circuit for processing a bit stream based on a dynamic image compressing standard, such as MPEG-4, MPEG-2, MPEG-1 or H.263, and said memory part is a memory having a unit corresponding to a data bus, i.e., said word region corresponding to a word region in a DRAM, the size of said word range on said image plane being preferably in the range of from 64 pixels to 256 pixels.

14. An image processing system having an image compressing and/or expanding unit for compressing and/or expanding image information, said image processing system including a memory consolidated image processing LSI comprising:

a memory part having a plurality of lattice-like page ranges for storing the image data of the page ranges which are formed by segmenting an image plane corresponding to a display screen and each of which has sides each having a length of a power of 2, namely $2^n$ (n=1, 2, 3 . . . ), and a plurality of word ranges for storing the image data of the word ranges which are formed by segmenting each of said page ranges and which are assembled to constitute each of said page ranges; and an image accrss part for accessing said word ranges after accessing said page ranges by a pre-charge in order to access said memory part, wherein each of said page ranges and each of said word ranges in said memory part of said memory consolidated image processing LSI are set to be a desired page range and a desired word range, which allow desired image data to be accessed at a minimum power consumption by a minimum number of pre-charges and a minimum number of charges.

15. An image processing system as set forth in claim 14, which further comprises: a raster converting part for raster converting said image information; and a processing part for converting the image data, which has been converted by said raster converting part, into data corresponding to said desired page and word ranges, wherein said memory consolidated image processing LSI stores the image data for said desired page and word ranges, which has been converted by said processing part, in said page and word regions of said memory part, and said image access part accesses by word-accessing said desired word region after being pre-charged in said desired page region of said memory part.

16. An image processing system as set forth in claim 14, which further comprises: a raster converting part for raster-converting said image information; a temporary memory part for temporarily storing the image data which has been converted by said raster converting part; and a processing part for converting said image data, which has been stored in said temporary memory part, into data corresponding to said desired page and word ranges, wherein said memory consolidated image processing LSI stores said desired page and word ranges, which have been converted by said processing part, in said page and word regions of said memory part, and said image access part accesses said desired word region after being pre-charged in said desired page region of said mennory part.

17. An image processing system as set forth in claim 14, which furter comprises an MPEG processing part for compression-coding image data using an MPEG coding system, wherein said memory consolidated image processing LSI stores said desired page and word ranges for the image data, which has been processed by said MPEG processing part, in said memory part, and said image access part accesses by word accessing said desired word region after being pre-charged in said desired page range of said memory part.

18. An image processing system as set forth in claim 14, wherein said image access part is a circuit for processing a bit stream based on a dynamic image compressing standard, such as MPEG-4, MPEG-2, MPEG-1 or H.263, and said memory part is a memory having said page region corresponding to said page range serving as a unit for the preparation for reading, the size of said page range on said image plane being preferably in the range of from 64 pixels to 512 pixels.

19. An image processing system as set forth in claim 14, wherein said image access part is a circuit for processing a bit stream based on a dynamic image compressing standard, such as MPEG-4, MPEG-2, MPEG-1 or H.263, and said memory part is a memory having said page region corresponding to said page range serving as a unit for the preparation for reading, the size of said page range on said image plane being preferably in the range of from 512 pixels to 1024 pixels.

20. An image processing system as set forth in claim 14, wherein said image access part is a circuit for processing a bit stream based on a dynamic image compressing standard, such as MPEG-4, MPEG-2, MPEG-1 or H.263, and said memory part is a memory having said word region corresponding to said word range as a unit corresponding to a data bus, the size of said word range on said image plane being preferably in the range of from 8 pixels to 64 pixels.

21. An image processing system as set forth in claim 14, wherein said image access part is a circuit for processing a bit stream based on a dynamic image compressing standard, such as MPEG-4, MPEG-2, MPEG-1 or H.263, and said memory part is a memory having said word region corresponding to said word range as a unit corresponding to a data bus, the size of said word range on said image plane being preferably in the range of from 64 pixels to 256 pixels.

22. A method for processing unage data stored in a memory consolidated image processing LSI, which comprises a memory part for storing predetermined image data and having page regions each storing page ranges so that an image plane corresponding to a display screen is segmented into lattice-like ranges each of which has sides a power of 2 long, and a word regions each storing word ranges which are formed by segmenting said page range on said image plane, and an access part for accessing to said memory part in the manner that a multiplied value of a power consumption per one of pre-charges in a power consumption model of a memory by an average number of the pre-charges is a substantially minimum value and that a substantially multiplied value of a power consumption per one of word accesses in a power consumption model of a memory by an average number of the word accesses is a substantially minimum value, said method comprising:

- a step of accessing in a first stage by pre-charging to said page region of said memory part in which desired data are stored;
- a step of accessing in a second stage by ward accessing to said word regions of said memory part in which desired data are stored;
- a step of reading out said desired data from said memory part; and
- a step of performing predetermined image processing to image data which are read in the manner that a multiplied value of a power consumption per one of pre-charges in a power consumption model of a memory by an average number of the pre-charges is a substantially minimum value, or a multiplied value of a power consumption per one of word accesses in a power consumption model of a memory by an average number of the word accesses is a substantially minimum value.

23. An image data processing method as set forth in claim 22, wherein said page region in said memory part is set to have a size so that the multiplied value of the power consumption per one of said pre-charges in a power consumption model of a memory by an average number of pre-charges is the substantially minimum value.

24. An image data processing method as set forth in claim 22, wherein said word region in said memory part is set to have a size so that the multiplied value of a power consumption per one of word accesses in a power consumption model of a memory by an average number of the word accesses is the substantially minimum value.

25. An image data processing method as set forth in claim 22, wherein said page region in said memory part is set to have a size so that the multiplied value of the power consumption per one of said pre-charges in a power consumption model of a memory by an average number of pre-charges is the substantially minimum value, and
said word region in said memory part is set to have a size so that the multiplied value of a power consumption per one of word accesses in a power consumption model of a memory by an average number of the word accesses is the substantially minimum value.

26. A method for designing a memory consolidated image processing LSI, which comprises a memory part for storing predetermined image data, and an access part for accessing said image data stored in said memory part by using two-stage accesses, said method comprising:

- a step of setting a plurality of page ranges so that an image plane corresponding to a display screen is segmented into lattice-like ranges, each of which has sides a power of 2 long, and so that the multiplied value of the power consumption per one of said pre-charges in a power consumption model of a memory by an average number of pre-charges is the substantially minimum value;
- a step of setting a page region capable of storing said image data for a page range on said image plane in said memory part a step of setting a plurality of word ranges which are formed by segmenting said page range on said image plane so that the multiplied value of a power consumption per one of word accesses in a power consumption model of a memory by an average number of the word accesses is the substantially minimum value;
- a step of setting a word region capable of storing said word ranges on said image plane in said page region in said memory part; and
- a step of storing said image data to be stored by allotting said data into each of said page regions and word regions in, said memory part by using a unit of said page ranges and word ranges in said image plane.

* * * * *